Patented May 21, 1935

2,002,277

UNITED STATES PATENT OFFICE 2,002,277

METHOD OF MAKING PHOSPHORUS OXYCHLORIDE

Harold P. Roberts, Nitro, W. Va., assignor, by mesne assignments, to Herbert S. Kreighbaum, Akron, Ohio No Drawing. Application March 6, 1933, Serial No. 659,836

19 Claims. (Cl. 23—203)

This invention relates to a method of making phosphorus oxychloride.

One object of this invention is the provision of a method of producing phosphorus oxychloride by reacting phosphorus trichloride and moist chlorine.

Another object is the provision of a process for saturating chlorine gas with water vapor at a definite temperature and reacting this moist gas with phosphorus trichloride to form phosphorus oxychloride.

Another object of my invention is the provision of a method which eliminates health hazards and dangerous operations heretofore present in other methods.

A further object of this invention is the provision of a method for producing phosphorus oxychloride of satisfactory purity from cheap materials without leaving a solid by-product.

Further objects will be in part obvious and in part hereinafter pointed out.

Previously known processes for producing phosphorus oxychloride have involved the oxidation of phosphorus trichloride by a solid, such as a metallic chlorate. One example of such chlorate is sodium chlorate. The disadvantage of using such oxidizing solids is that a solid residue of sodium chloride is obtained, and this residue carries off some of the formed phosphorus oxychloride product when it is periodically removed. Owing to the violence of the reaction between water and the formed oxychloride, disposal of the residue with its oxychloride content is quite a problem. The residue when wetted in corrosive to equipment and also a hazard to the health of operators.

Other processes involve successive chlorination of the trichloride to form the solid pentachloride and then reacting the pentachloride with water to obtain the product. Great dangers are encountered in such processes as stoppage in the lines is apt to occur due to the formation of the solid pentachloride.

My invention overcomes the objections of the prior art processes and enables me to produce phosphorus oxychloride by the oxidation of phosphorus trichloride at a lower cost and without the hazards hereinbefore recited.

The preferred form of my invention comprises oxidizing phosphorus trichloride with chlorine gas and water vapor according to the following reaction:

$2PCl_3 + 2Cl_2 + 2H_2O \text{(vapor)} \rightarrow 2POCl_3 + 4HCl$

The phosphorus trichloride may be prepared by the chlorination of phosphorus. Chlorine gas is passed into a suspension of phosphorus in phosphorus trichloride contained in a reaction vessel provided with a cooling surface and a suitably connected condenser and receiver. The phosphorus trichloride serves to make the reaction proceed with less violence than if phosphorus is reacted with dry chlorine. Also by using this method the formation of the pentachloride is reduced.

The reaction proceeds satisfactorily after the temperature is raised to about 72 to 75° C. The heat of reaction is greater than the heat of vaporization and, accordingly, heat must be absorbed sufficient to maintain the volume of the suspension liquid. I prefer to maintain this volume by returning a stream of phosphorus trichloride from the condenser to the reaction vessel. The phosphorus trichloride to be used in the preferred form of my invention may be prepared as above set forth or may be prepared by any other known methods. Of course, it is to be understood that I may use phosphorus trichloride which is on the market as such without having to prepare it at the plant.

The phosphorus trichloride prepared in the above or any other way is reacted with wet chlorine to produce phosphorus oxychloride. Chlorine gas is passed through a humidifier where the gas is caused to pick up the amount of water vapor required for the reaction. The moist gas is then passed into the phosphorus trichloride. Phosphorus oxychloride is formed at once without accumulation of solid intermediates or a solid by-product. The reaction is allowed to proceed until the trichloride is completely reacted. For high purity, the reaction product containing phosphorus oxychloride is finally distilled.

The humidifier is heated, preferably by steam, to such a temperature that the molar partial pressures of the chlorine and water are equal, that is, at such a temperature that about 71 pounds (one pound mol) of chlorine gas will contain about 18 pounds (one pound mol) of water vapor. This temperature is about 85° C. The humidity may be produced by passing the chlorine gas through water at 85° C. so that the chlorine becomes saturated with water vapor at that temperature. The humidity may also be produced by passing steam at a rate to maintain a temperature of about 85° C. into a chamber through which chlorine is passing. If there is an excess of water vapor, it is condensed and the condensed water vapor is trapped off from the chamber. The humidified chlorine is then led into or bubbled through the phosphorus trichloride until the amount of chlorine, fed from a weighed tank, is that required by the equation given in the above reaction. The temperature of the reaction vessel in which the phosphorus trichloride and water-wet chlorine gas are reacted is maintained in the neighborhood of 40° C. The hydrochloric acid gas evolved as a by-product of the action is passed through a long condenser maintained at a low temperature. Finally, the phosphorus oxychloride may be scrubbed out by a high boiling absorbent, as for example, cresylic acid.

One example of preparing phosphorus trichloride and then reacting this trichloride with humidified chlorine is as follows: A sufficient quantity of phosphorus trichloride such as about 500 pounds, is placed in the reaction kettle to be used as a suspending medium. In a separate calibrated vessel, about 310 pounds of phosphorus are melted under water and the melt is held at a temperature of about 50° C. for a time to allow the water to rise from the lower phosphorus layer. The vessel in which the phosphorus is melted should have additional phosphorus to bring the layer up to the lowest point of the calibration. The phosphorus is then dropped into the trichloride reaction kettle, its temperature previously having been raised to about 50° C. or not over about 70° C. Dry chlorine is now passed in from a weighed tank through a well line until there have been added about 1065 pounds. The original volume of the phosphorus trichloride is maintained by adjusting the rate of reflux of the trichloride distilled out by the heat of reaction. The phosphorus trichloride produced is distilled off to a receiver and from the receiver is charged through a pipe to the oxidizer kettle for reaction with wet chlorine to form phosphorus oxychloride.

Into the oxidizer kettle, provided with cooling coils and a reflux condenser and a suitable well line, there are charged about 1375 pounds of phosphorus trichloride. From a chlorine weigh tank, provided with a little heating surface to assist evaporation, about 1065 pounds of chlorine gas are passed through water held at a temperature of about 85° C. and from there into the oxidizer kettle. The humidity, if desired, may be produced by mixing steam with the chlorine so as to maintain the temperature and then trap off the water condensed. The hydrochloric acid gas formed as a by-product of the reaction is passed through well cooled condensers to lower the amount of the phosphorus oxychloride and trichloride carried out. After passing through the condenser, the residual chlorides can be scrubbed out of the hydrochloric acid gas by means of a suitable high boiling solvent as for example, cresylic acid.

After the phosphorus trichloride has absorbed the required amount of wet chlorine, the phosphorus oxychloride formed can be distilled.

Variations in the process are possible. For example, I may use syrupy phosphoric acid which consists of 85% phosphoric acid and the balance water. The water functions to assist in the oxidation as set out in my preferred example. The reaction is as follows:

$$H_3PO_4 + 3PCl_3 + 3Cl_2 \rightarrow 4POCl_3 + 3HCl$$

*Example for use of phosphoric acid.*—200 parts by weight phosphorus oxychloride were placed in a suitable container equipped with stirrer and means for heating and cooling and for introduction of chlorine. 125.3 parts by weight of 85% syrupy phosphoric acid ($H_3PO_4$) and 598 parts by weight of phosphorus trichloride $PCl_3$ were run in slowly and simultaneously while chlorine was slowly bubbled into the reacting mixture. Good stirring was required as during the reaction there was formed a gelatinous mass which is best broken up. In the beginning the reaction mixture is kept relatively cool (25° C.); as the reaction progresses the temperature gradually rises from about 40° C. to at the end around 100° C. Some heat was evolved during the reaction. During the last half, gentle heating was employed. The total time of the reaction was in the neighborhood of five hours. The total quantity of chlorine charged was 269 parts by weight. When the reaction was completed the mixture was distilled using a good fractionating column. The first fraction boiling up to 105° C. was 47 parts by weight. This consisted mainly of phosphorus trichloride. The main fraction boiling 105 to 107.5° C. at atmospheric pressure was 892 parts by weight, and consisted almost entirely of phosphorus oxychloride.

Other variations of the process may be employed. For example mono sodium phosphate $NaH_2PO_4.H_2O$, disodium phosphate $$Na_2HPO_4.12H_2O$$

or any other water soluble phosphate may be used. For example, ordinary trisodium phosphate $Na_3PO_4.12H_2O$ may be employed. The water of crystalization reacts with the chlorine and phosphorus trichloride liberating hydrochloric acid and forms phosphorus oxychloride as above described. The hydrochloric acid in turn forms sodium chloride and phosphoric acid. The phosphoric acid then reacts as above described. The reaction may be represented by the following equation:—

$$15PCl_3 + Na_3PO_4.12H_2O + 15Cl_2 = 16POCl_3 + 3NaCl + 24HCl$$

Any salt of phosphoric acid which will dissolve in phosphorus trichloride or in water and which will yield phosphoric acid when treated with hydrochloric acid will function in the same manner. In fact any phosphate whether water soluble or not may be employed if on treatment with hydrochloric acid, phosphoric acid is produced. For example, if finely powdered phosphate rock—calcium phosphate—is suspended in phosphorus oxychloride, and phosphorus trichloride be slowly added while moist chlorine gas is bubbled in, one obtains phosphorus oxychloride. The hydrochloric acid from the reaction between water, phosphorus trichloride and chlorine reacts with the calcium phosphate yielding phosphoric acid and calcium chloride. The phosphoric acid then reacts as above indicated.

It should also be mentioned that the various modifications of phosphoric acid and their salts may also be employed. One may consider phosphoric acid, i. e. orthophosphoric acid as $P_2O_5 + 3H_2O$. In like manner pyrophosphoric acid may be considered at $P_2O_5 + 2H_2O$ and metaphosphoric acid as $P_2O_5 + H_2O$. All such acids and their salts are useful. Furthermore, since chlorine and water form an excellent oxidizing agent one may employ those acids and their salts derived from phosphorus oxides lower in oxygen than phosphorus pentoxide $P_2O_5$. Thus phosphorus oxide, $P_2O_3$, yielding hypophosphorus acid, $H_3PO_2$, and phosphorus tetroxide $PO_2$ yielding phosphorus acid $H_3PO_3$ may be employed instead of those acids like phosphoric which are derivatives of phosphorus pentoxide though in the case of the acids from lower oxides moist chlorine must be employed, whereas in the case of the acids and salts from phosphorus pentoxide the chlorine gas does not need to be humidified.

The phosphorus oxychloride held in the sodium chloride or other metallic chloride at the end of the run may be removed by extraction with a suitable inert solvent as for example carbon tetrachloride. As mentioned above the phosphorus oxychloride swept out by the hydrochloric acid evolved may be scrubbed out with cresylic acid in an ordinary gas scrubbing tower.

While I have given specific examples for carrying out my invention it is to be expressly understood that I am not to be limited to the exact details as variations of the conditions and proportions within limits are contemplated by my invention.

What I claim is:

1. A method of the character described, which comprises, reacting phosphoric acid, phosphorus trichloride and chlorine in the presence of water to form phosphorus oxychloride.

2. A method of the character described, which comprises, treating phosphorus trichloride with chlorine gas in the presence of water and phosphoric acid to form phosphorus oxychloride.

3. A method of the character described, which comprises, causing a reaction between phosphorus trichloride and moist chlorine gas to form phosphorus oxychloride.

4. A method of the character described, which comprises, reacting phosphorus trichloride and chlorine gas in the presence of water vapor to form phosphorus oxychloride.

5. A method of the character described, which comprises, passing chlorine gas through water and then adding the moist chlorine gas to phosphorus trichloride to form phosphorus oxychloride.

6. A method of the character described, which comprises, saturating chlorine with water at about 85° C. and then reacting the moist chlorine with phosphorus trichloride to form phosphorus oxychloride.

7. A method of the character described, which comprises, reacting phosphorus trichloride and chlorine saturated with water to form phosphorus oxychloride.

8. A method of the character described, which comprises, saturating chlorine with water and reacting phosphorus trichloride with such mixture to form phosphorus oxychloride.

9. A method of the character described, which comprises, introducing chlorine and water vapor into phosphorus trichloride to form phosphorus oxychloride and controlling the amount of water vapor introduced.

10. A method of the character described, which comprises, reacting phosphorus trichloride and chlorine in the presence of water vapor at about 40° C. to form phosphorus oxychloride.

11. A method of the character described for making phosphorus oxychloride, which comprises, mixing chlorine gas and water, and maintaining the gas at such a temperature that the chlorine gas will take up substantially an equal molecular weight of water, and oxidizing phosphorus trichloride therewith.

12. In the method of oxidizing phosphorus trichloride in the presence of chlorine and water, the step which comprises, mixing chlorine and water at such a temperature so that the chlorine will take up substantially an equal molecular weight of water.

13. In the method of oxidizing phosphorus trichloride in the presence of chlorine and water, the step which comprises, mixing chlorine and water at a temperature of about 85° C. so that the chlorine will take up a predetermined amount of water.

14. A method of the character described, which comprises, adding a sufficient amount of a mixture of chlorine gas and water vapor to phosphorus trichloride to react therewith and form phosphorus oxychloride, the chlorine gas and water vapor being in substantially equi-molecular proportions.

15. A method of the character described for making phosphorus oxychloride, which comprises, mixing chlorine gas and water at a temperature of about 85° C. so that the chlorine will take up a predetermined amount of water, and oxidizing phosphorus trichloride therewith.

16. A method of the character described for making phosphorus oxychloride, which comprises, mixing chlorine gas and water at a temperature of about 85° C. so that the chlorine will take up substantially an equal molecular weight of water, and oxidizing phosphorus trichloride with such mixture of chlorine and water.

17. A method of the character described which comprises, reacting a compound containing a phosphate radical, phosphorus trichloride and chlorine in the presence of water to form phosphorus oxychloride.

18. A method of the character described, which comprises, reacting an oxygenated phosphorus compound with phosphorus trichloride and chlorine gas in the presence of water to form phosphorus oxychloride.

19. A method of preparing phosphorus oxychloride, which comprises oxidizing phosphorus trichloride by means of chlorine and a vaporized oxidizing substance which substance liberates its oxygen during the reaction.

HAROLD P. ROBERTS.